(12) United States Patent
Wei (10) Patent No.: US 11,973,621 B2
(45) Date of Patent: Apr. 30, 2024

(54) POWER EFFICIENT SLICER FOR DECISION FEEDBACK EQUALIZER

(71) Applicant: Samsung Display Co., Ltd., Yongin-si (KR)

(72) Inventor: Da Wei, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 56 days.

(21) Appl. No.: 17/683,204

(22) Filed: Feb. 28, 2022

(65) Prior Publication Data

US 2023/0198816 A1 Jun. 22, 2023

Related U.S. Application Data

(60) Provisional application No. 63/291,121, filed on Dec. 17, 2021.

(51) Int. Cl.
*H04L 25/03* (2006.01)

(52) U.S. Cl.
CPC ................ *H04L 25/03057* (2013.01)

(58) Field of Classification Search
CPC ......... H04L 25/03006; H04L 25/03019; H04L 25/03057
USPC ......... 375/232, 233, 346, 348; 708/322, 323
See application file for complete search history.

(56) References Cited

U.S. PATENT DOCUMENTS

| | | | |
|---|---|---|---|
| 9,621,136 B1 * | 4/2017 | Chang | H03L 7/091 |
| 9,654,315 B2 * | 5/2017 | Wei | H04L 25/03878 |
| 9,722,828 B2 * | 8/2017 | Sun | H04L 27/01 |
| 9,755,655 B1 | 9/2017 | Hudner | |
| 9,973,356 B1 * | 5/2018 | Livne | H04L 25/03057 |
| 10,038,575 B1 | 7/2018 | Steffan et al. | |
| 10,097,383 B1 | 10/2018 | Bulzacchelli et al. | |
| 2010/0202506 A1 | 8/2010 | Bulzacchelli et al. | |
| 2014/0159807 A1 | 6/2014 | Sun et al. | |
| 2015/0312060 A1 | 10/2015 | Sinha | |
| 2017/0093379 A1 | 3/2017 | Lovitt | |
| 2019/0095308 A1 | 3/2019 | Morris | |
| 2020/0213165 A1 * | 7/2020 | Iyer | H04L 25/4917 |
| 2021/0250000 A1 * | 8/2021 | Kang | H03G 1/0088 |
| 2021/0266200 A1 | 8/2021 | Yang et al. | |
| 2021/0288846 A1 | 9/2021 | Yi et al. | |
| 2022/0286327 A1 * | 9/2022 | Manian | H04L 25/03057 |

OTHER PUBLICATIONS

Bulzacchelli, John F., "Equalization for Electrical Links: Current design techniques and future directions," IEEE Solid-State Circuits Magazine, IEEE, 2015, pp. 23-31.

(Continued)

*Primary Examiner* — Young T. Tse
(74) *Attorney, Agent, or Firm* — Lewis Roca Rothgerber Christie LLP (57) ABSTRACT

A data slicer may include an input transistor configured to generate an internal output voltage based on an input voltage at an input node. An output node may be configured to output an output voltage based on the internal output voltage, and a feedback transistor may be configured to adjust the internal output voltage based on a correction voltage corresponding to output of the output node in a previous cycle.

20 Claims, 7 Drawing Sheets

(56) References Cited

OTHER PUBLICATIONS

Hsieh, Chang-Lin et al., "Decision Feedback Equalizers Using the Back-Gate Feedback Technique," IEEE Transactions on Circuits and Systems—II: Express Briefs, IEEE, vol. 58, No. 12, Dec. 2011, pp. 897-901.

EPO Extended European Search Report dated Apr. 13, 2023, issued in corresponding European Patent Application No. 22214726.6 (10 pages).

* cited by examiner

POWER EFFICIENT SLICER FOR DECISION FEEDBACK EQUALIZER

CROSS-REFERENCE TO RELATED APPLICATION(S)

This application claims priority to and the benefit of U.S. Provisional Application No. 63/291,121, filed Dec. 17, 2021, which is incorporated herein by reference in its entirety.

FIELD

The present application generally relates to circuit designs for slicers, and more particularly to a power efficient slicer for a decision feedback equalizer.

BACKGROUND

In some circuits, a bandwidth of a channel between a transmitter and a receiver is less than the bandwidth of the signal that is being transmitted over the channel. Thus, the signal may become distorted, for example, by inter symbol interference (ISI) from a previous cycle.

SUMMARY

According to various embodiments a data slicer may include an input transistor configured to generate an internal output voltage based on an input voltage at an input node, an output node configured to output an output voltage based on the internal output voltage, and a feedback transistor configured to adjust the internal output voltage based on a correction voltage corresponding to output of the output node in a previous cycle.

The internal output voltage may be adjusted by turning on the feedback transistor by the correction voltage.

The correction voltage may be a digital logic signal.

The turning on the feedback transistor may include reducing the internal output voltage to generate an adjusted internal output voltage, and in response to turning on the feedback transistors, the output node is configured to output the output voltage based on the adjusted internal output voltage.

The adjusted internal output voltage may be a clean signal that is free of affection by previous bits.

The data slicer may further include an amplifier circuit configured amplify the adjusted internal output voltage to generate a floating output voltage, and in response to amplifying the adjusted internal output voltage, the output node is configured to output the output voltage based on the floating output voltage.

The data slicer may further include a regeneration circuit coupled to the output node.

The regeneration circuit may include a cross-coupled inverter configured to pull the floating output voltage to generate the output voltage.

According to other embodiments of the present disclosure, a method for operating a data slicer including an input transistor configured to generate an internal output voltage based on an input voltage at an input node, an output node configured to output an output voltage based on the internal output voltage, and a feedback transistor configured to adjust the internal output voltage based on a correction voltage corresponding to output of the output node in a previous cycle is described. The method may include pulling the output voltage to a source voltage in a first phase, applying the input voltage to the input transistor and the correction voltage to the feedback transistor in a second phase to generate the internal output voltage in the second phase, wherein an amplifier circuit outputs a floating output voltage to a regeneration circuit in response to the adjusted internal output voltage, and deactivating the amplifier circuit and activating the regeneration circuit in a third phase, wherein the regeneration circuit regenerates the output voltage at the output node.

The method may further include resetting the input transistor and the feedback transistor by turning on the input transistor and the feedback transistor in the first phase.

The internal output voltage may be generated by operating the input transistor as a common source amplifier in the second phase.

The method may further including adjusting the internal output voltage by the feedback transistor based on the correction voltage.

According to yet other embodiments of the present disclosure, a data slicer may include a linear tracking circuit. The linear tracking circuit may include a pair of input transistors each configured to generate a respective internal output voltage based on a corresponding input voltage at a respective input node, and a pair of feedback transistors each configured to adjust the respective internal output voltage of the pair of input transistors based on a correction voltage corresponding to a corresponding output voltage of a previous cycle at an output node.

The respective internal output voltage may be adjusted by turning on one of the pair of feedback transistors by the correction voltage.

The correction voltage may be a digital logic signal.

The turning on the one of the pair of feedback transistors may include reducing a corresponding internal output voltage to generate an adjusted internal output voltage, and in response to turning on the one of the pair of feedback transistors, the output node is configured to output the output voltage based on the adjusted internal output voltage.

The adjusted internal output voltage may be a clean signal that is free of affection by previous bits.

The data slicer may further include an amplifying circuit configured to amplify the adjusted internal output voltages from the linear tracking circuit to generate a pair of floating output voltages, and in response to amplifying the adjusted internal output voltages, the output node is configured to output the output voltage based on the pair of floating output voltages.

The data slicer may further include a regeneration circuit coupled to the amplifying circuit.

The regeneration circuit includes cross-coupled inverter configured to pull the pair of floating output voltages to generate the pair of output voltages.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

In certain electronic systems and devices, distortion such as ISI from data transmission may be reduced by including a feedback stage to adjust the gain of the transmission signal in the circuit. However, some techniques may be faced with time delay challenges resulting from parasitic capacitances and generally consume a lot of power. Therefore, more efficient techniques to address distortions while improving power efficiencies in a more relaxed timing constraints are desired.

A Decision Feedback Equalizer (DFE) is a type of circuit that performs non-linear equalization by relying on decisions about the levels of voltages from a previous cycle to adjust the voltage levels of a current cycle. Accordingly, a DFE is able to account for distortion in the current cycle that are caused by the previous cycles, and thereby reduce or cancel inter-symbol interference (ISI) without amplifying noise.

Figure 1:
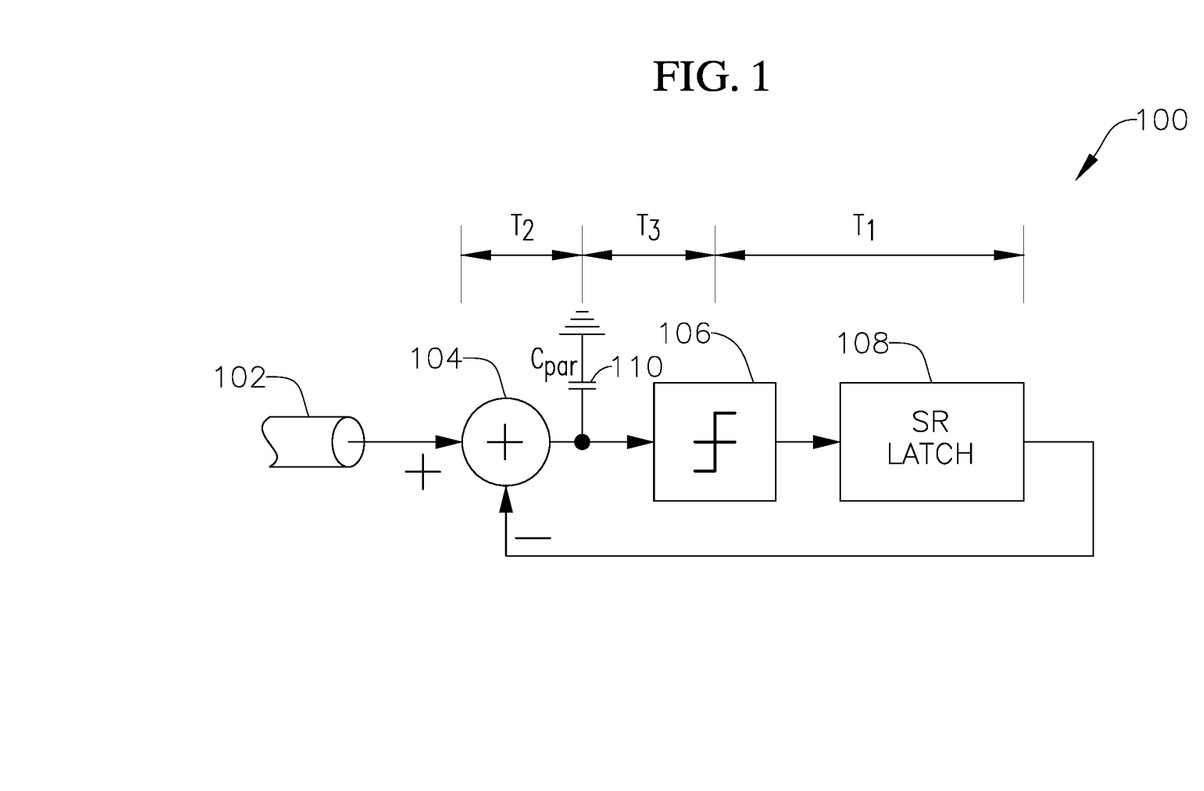
FIG. 1 is an example decision feedback equalizer (DFE) circuit, according to some embodiments of the present disclosure.

FIG. 1 is an example DFE circuit 100, according to some embodiments. The illustrated example DFE circuit 100 includes an adder 104 coupled to an electrode 102 providing an input voltage (e.g., a digital input signal) to the adder 104. The adder 104 may be coupled to a slicer 106, and the slicer 106 may be coupled to an input of a flip flop, such as, for example, a set/reset (SR) latch 108 or in some embodiments, a D flip flop. In some embodiments, the slicer 106 may be a circuit that samples an input analog signal and outputs a digital signal, such as, for example an analog-to-digital converter (ADC). An output of the SR latch 108 may also be coupled to the adder 104 to provide feedback. An SR latch 108 may be configured to output a positive voltage (which corresponds to a logic 1 or a "high") or a negative voltage (which corresponds to a logic 0 or a "low") as a previous bit feedback to the adder 104. Accordingly, if the feedback from the previous bit is a 0, the adder 104 may add a negative voltage to the input voltage, and if the feedback from the previous bit is a 1, then the adder 104 may subtract a positive voltage from the input voltage. Accordingly, non-linear equalization may be performed on the input voltage.

However, the DFE operation by the DFE circuit 100 may be time consuming. For example, there is a time delay T1 caused by slicer CLK2Q, which may include delays or latency from the various transistors in the slicer turning on and/or turning off and the time it takes for the slicer to amplify a signal, regenerate, and the propagation time of the SR latch flip flop. In some embodiments, there may also be a time delay T3 caused by a slicer setup, which may include the amount of time it takes to set up the slicer, for example, because an input stage of the slicer may not be able to react to the changes of the input instantaneously, the input signal needs to be stable (e.g., after changing states) for a period of time (e.g., the setup time) before the sampling clock edge to ensure proper operation of the slicer. This period of time may be the setup time or time delay T3. Finally, in some embodiments, a time delay T2 may be caused by an adder delay. Accordingly, a time constraint is created such that the sum of time delays T1+T2+T3<1 Unit Interval (UI) of the received signal to ensure that the DFE operation based on previous bits have settled before the current bit is sliced.

In other words, the received signal should be processed by the adder 104, the slicer 106 and the SR latch 108 within the time constraint of 1 UI so that the feedback from the previous bits are also processed and settled before the current bit is actually sliced. In some instances, it may be difficult to maintain the time delay T1+T2+T3<1 UI, particularly because time delay T2 by the adder delay is a relatively large delay due to parasitic capacitance 110 by the adder 104. Moreover, scaling the adder bandwidth may be difficult because of the analog nature of the adder 104, whereas the slicer 106 and the SR latch 108 are digital. Accordingly, a more efficient technique to relax the time constraint is desired.

Figure 2:
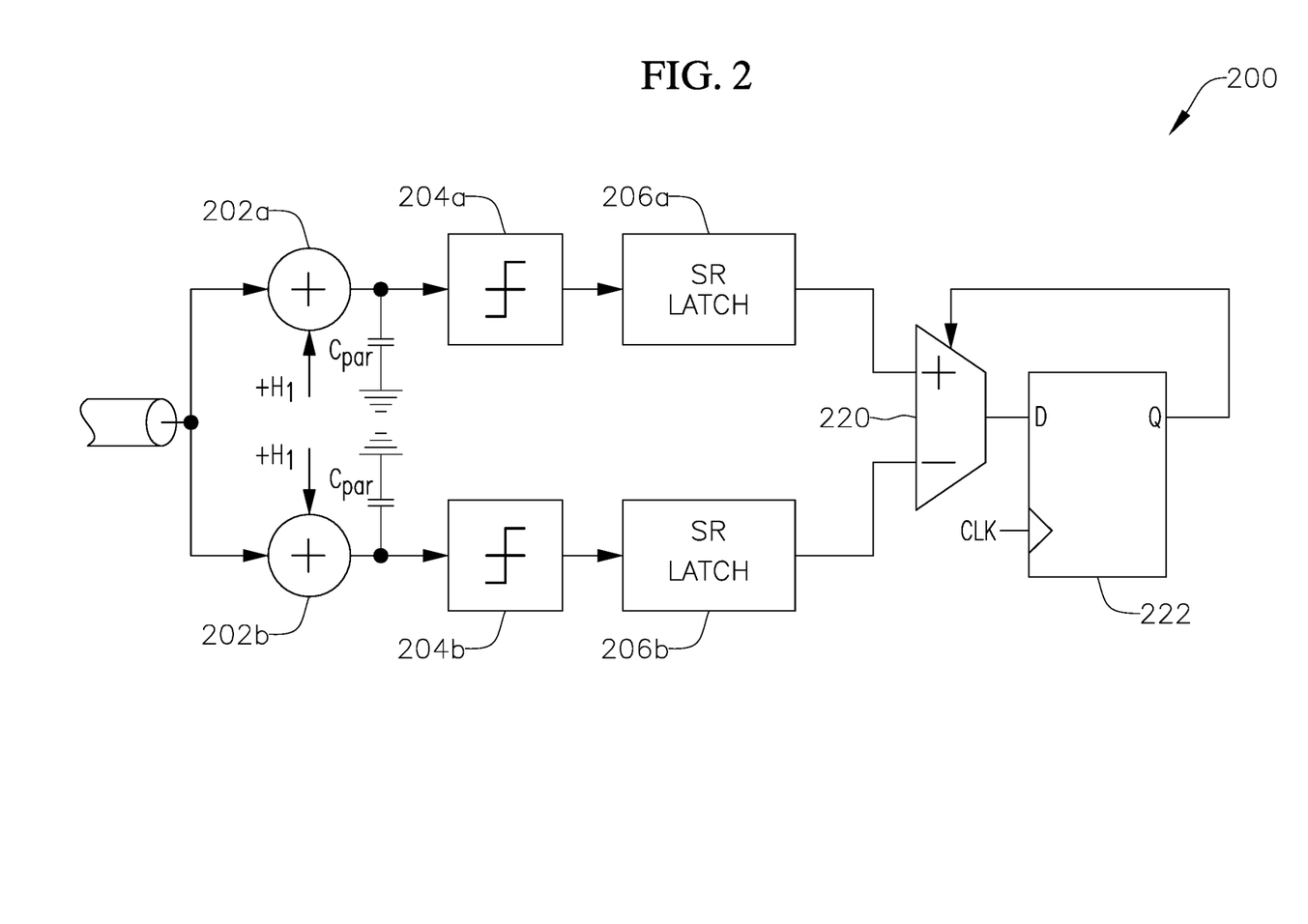
FIG. 2 is another example DFE circuit, according to some embodiments of the present disclosure.

One technique for relaxing the time constraint is to include two adder paths. FIG. 2 illustrates an example DFE circuit 200 where two adders 204a, 204b operate in parallel, wherein one of the adders 204a adds a voltage (+$H_1$) and the other adder 204b subtracts a voltage (−$H_1$). Each of the adders 204a, 204b may be coupled to a respective slicer 206a, 206b, and each of the slicers 206a, 206b may be coupled to a respective SR latch 208a, 208b. In some embodiments, the SR latch 208a, 208b may be a D flip flop, but such case may consumer more power and may be more expensive due to additional clocking circuitry that is used by a D flip flop. Here, each of the SR latches 208a, 208b may be coupled to an input of a multiplexer 220, and the multiplexer 220 may be configured to select one of the inputs based on previous bit received as feedback from D flip flop 222. Accordingly, the adders 204a, 204b may be effectively removed from the feedback loop and the time constraint may be relaxed. However, a DFE circuit such as the one illustrated in FIG. 2 may be more costly because there are two separate paths that are formed by two adders 204a, 204b, two slicers 206a, 206b, two SR latches 208a, 208b, and a multiplexer 220. Consequently, such circuit may occupy more space on circuit chip, and may consume more power. Additionally, the use of a multiplexer 220 coupled to a D flip flop 222, and relying on this feedback to select one of the two inputs to the multiplexer results in further time delay.

According to other embodiments of the present disclosure, the time constraint may be relaxed by including a dedicated linear tracking stage within the slicer, thereby eliminating the time delay caused by the adder T2, while utilizing less hardware and physically occupying less space on the chip, thereby also reducing power consumption.

Figure 3:
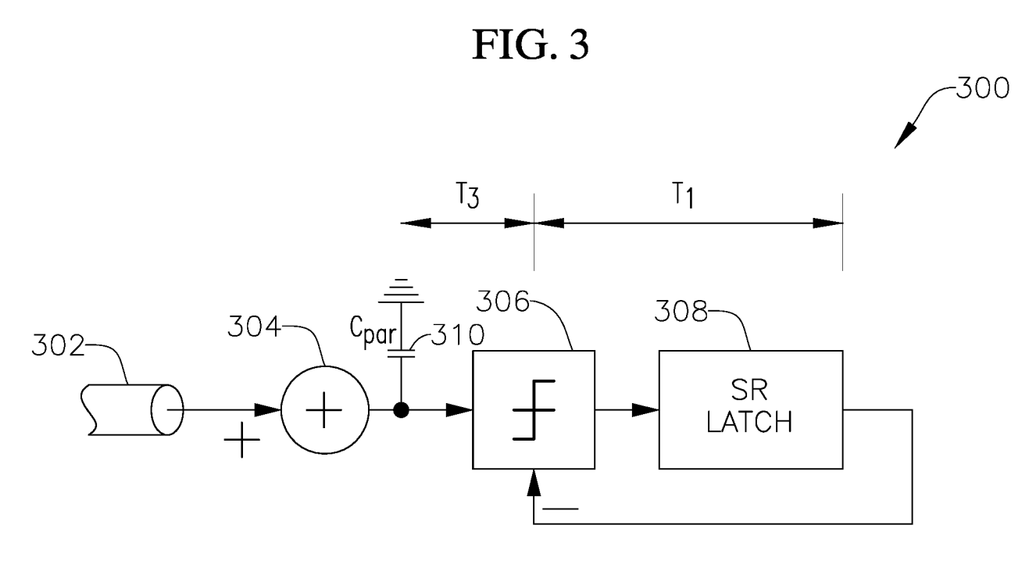
FIG. 3 is another example DFE circuit, according to some embodiments of the present disclosure.

FIG. 3 illustrates an example DFE circuit 300 with a dedicated linear tracking stage within a slicer 306, according to various embodiments of the present disclosure. The DFE circuit 300 may include an adder 304 coupled to an electrode 302 providing an input voltage (e.g., a digital input signal) to the adder 304, and the adder 304 that operates as an amplifier may be coupled to the slicer 306, which is coupled to an input of a flip flop, such as, for example, an SR latch 308. Differently from the DFE circuit 100 illustrated in FIG. 1, the DFE circuit 300 in FIG. 3 includes a feedback from the SR latch 308 to the slicer 306 instead of to the adder 304, thereby effectively removing the adder 304 from the feedback loop. Accordingly, the new time constraint no longer includes the adder delay T2, but instead includes just the time delay T1 caused by the slicer CLKQ2 and the time delay T2 caused by the slicer setup. Accordingly, the new time constraint is now T1+T3<1 UI, thereby effectively removing time delay T2 from the constraint. Additionally, in comparison to the DFE circuit 200 in FIG. 1, the DFE circuit 300 in FIG. 3 relaxes the time constraint and may also result in using only about half the hardware. In other words, the DFE circuit 300 may reduce the power consumption and the area physically occupied by the circuitry in about half, thereby resulting in further cost savings.

Figure 4:
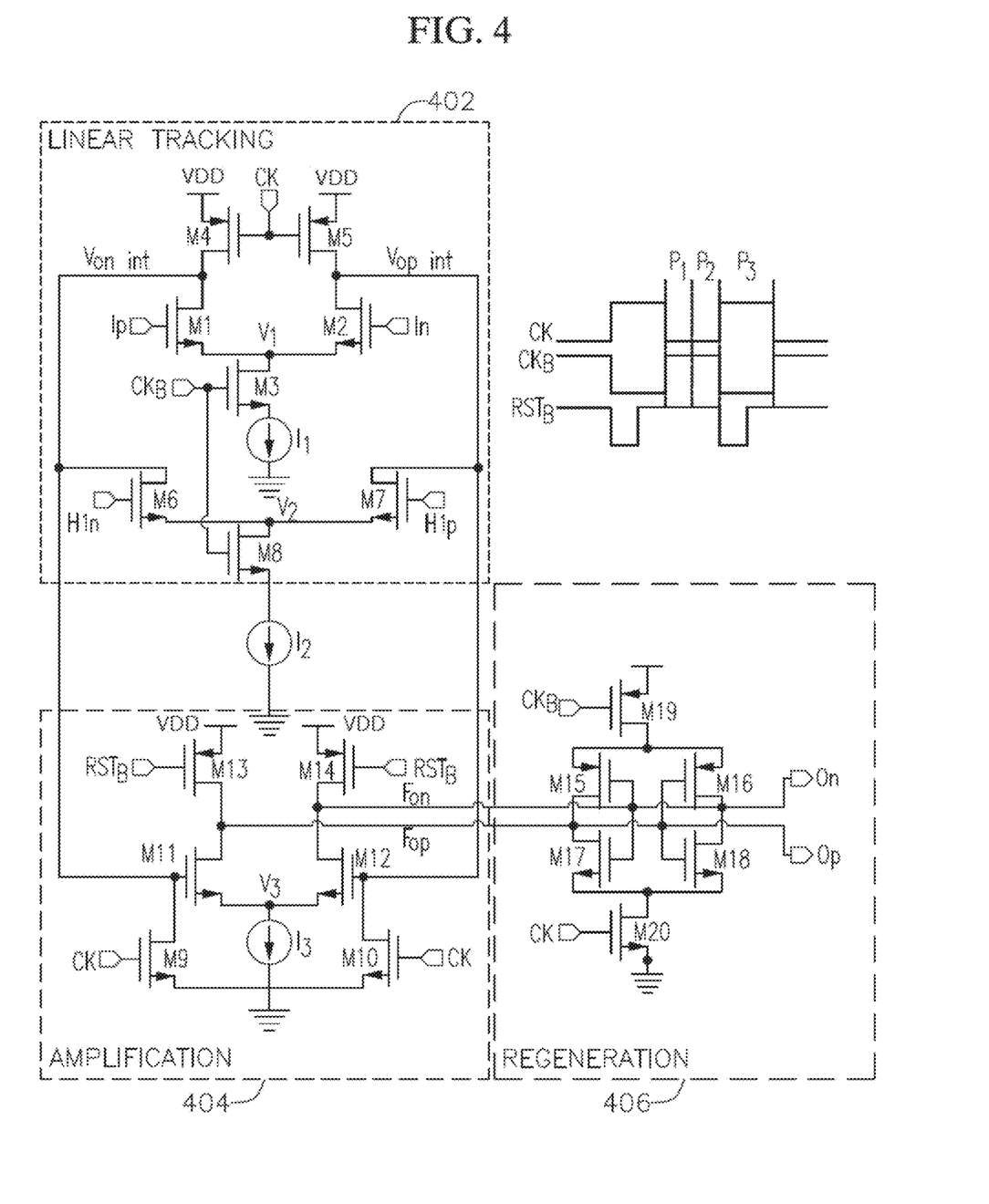
FIG. 4 is a schematic diagram of an example slicer including a linear tracking stage within the slicer, and a timing diagram of the slicer, according to various embodiments of the present disclosure.

FIG. 4 is a schematic diagram of an example slicer (e.g., a data slicer) that includes the linear tracking stage within the slicer, and a timing diagram of the slicer, according to various embodiments of the present disclosure. The slicer 306 includes three stages: a linear tracking stage 402, an amplification stage 404, and a regeneration stage 406, and may operate in three phases (P1, P2, P3). The operation of the slicer 306 will be described in more detail later.

In some embodiments, the linear tracking stage 402 may be configured to take an input voltage (e.g., digital input signal), amplify the input voltage to generate an internal output voltage, and make adjustments to the internal output voltage by applying a correction voltage. The correction voltage may reduce the internal output voltage, and this adjusted internal output voltage (a clean signal) may be provided to the amplification stage 404. The amplification stage 404 may then take the clean signal from the linear tracking stage 402 without any residual bits from the previous stage and further amplify this signal. Because this amplified signal is still a relatively small voltage, e.g., the regeneration stage 406 may further amplify this signal to generate a rail-to-rail symbol, e.g., a signal where the voltage corresponds to the source voltage such as VDD.

In some embodiments, the linear tracking stage 402 includes a pair of input transistors M1 and M2. The input transistors M1 and M2 may be an NMOS, and an input voltage Ip may be provided to the gate of input transistor M1 and an input voltage In may be provided to the gate of input transistor M2. In some embodiments, the input voltages Ip and In may be provided from the previous stage, e.g., the output of adder 304 in FIG. 3. A pair of PMOS resistive load transistors M4 and M5 may be coupled to the drain of the input transistors M1 and M2, respectively.

In some embodiments, a pair of feedback transistors M6 and M7 may also be coupled to the drain of input transistors M1 and M2, respectively. The feedback transistors M6 and M7 may be NMOS, and the gates of the feedback transistors M6 and M7 may be coupled to correction voltages H1$n$ and H1$p$, respectively. The correction voltages H1$n$ and H1$p$ may be provided from the previous cycle and may correspond to a logic 1 or 0.

In some embodiments, the source of the input transistors M1 and M2 may be coupled to a drain of an NMOS transistor M3, and the source of the NMOS transistor M3 may be coupled to a current source I1. The source of the feedback transistors M6 and M7 may be coupled to a drain of an NMOS transistor M8, and the source of the NMOS transistor M8 may be coupled to a current source I2. The gates of NMOS transistors M3 and M8 may be coupled together and further coupled to a second clock CKB. It should be noted that while some transistors are shown here as NMOS transistors and other transistors are shown as PMOS, other combinations of NMOS and PMOS transistors may be implemented. Moreover, in some embodiments, the transistors may not necessarily be limited to metal-oxide-silicon field-effect transistors (MOSFETs), but may instead be bipolar junction transistors (BJTs), field-effect transistors, junction-field effect transistors (JFETs), among others.

In some embodiments, the amplification stage may be coupled to the drain of the input transistors M1 and M2 and the drain of the feedback transistors M6 and M7 to receive the adjusted internal output voltages. The amplification stage includes transistors M11 and M12 to amplify the received adjusted internal output voltages, and the source of the transistors M11 and M12 are coupled to the regeneration stage. In some embodiments, the regeneration stage may include transistors M15-M18 arranged to act as a cross-coupled inverter. Accordingly, the voltage received from the amplification stage may be applied to the cross-coupled inverter and the output of the cross-coupled inverter may be coupled to output nodes On and Op.

Figure 5:
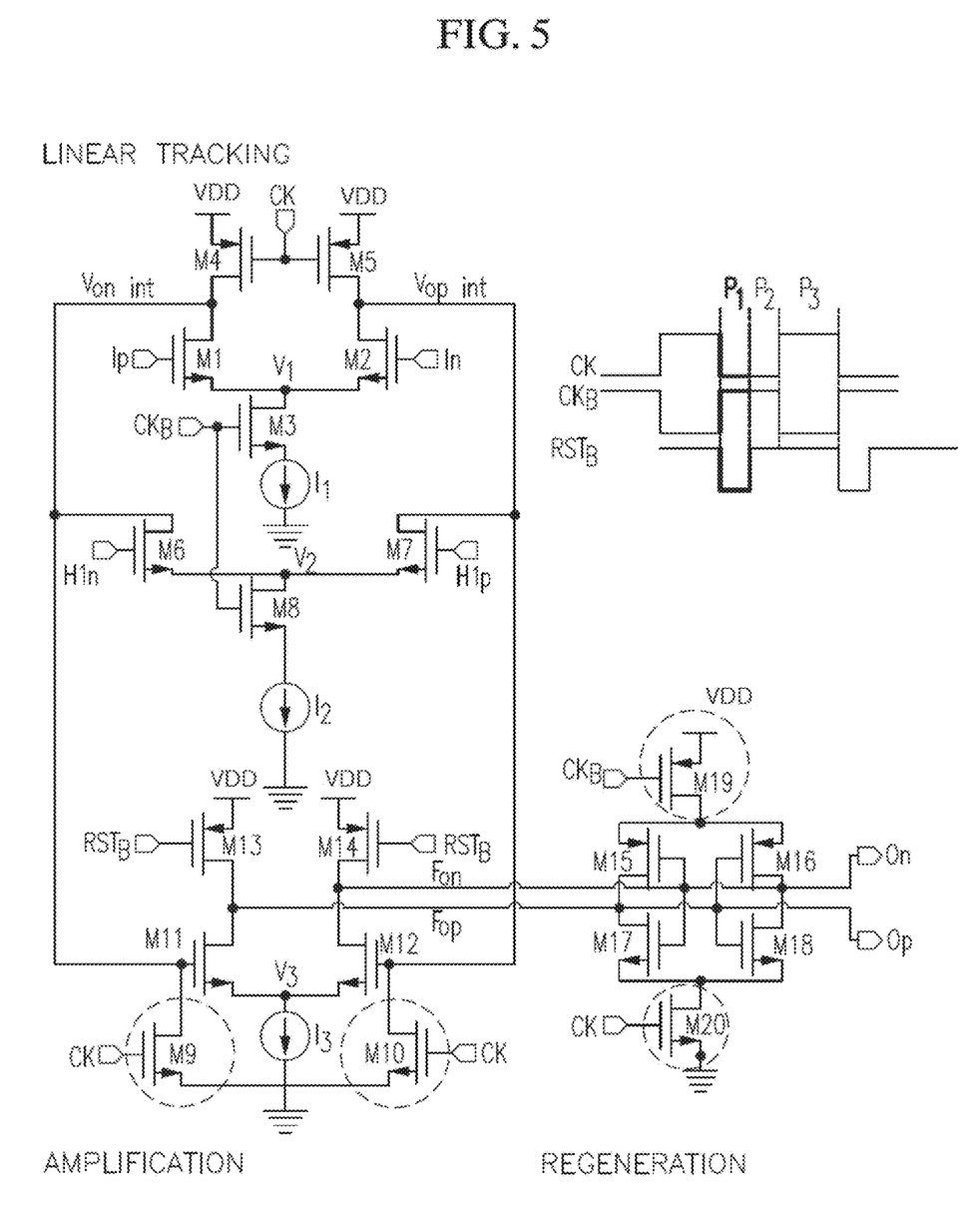
FIGS. 5-7 is a schematic diagram of the slicer of FIG. 3 in operation during various phases of operation of the slicer, according to various embodiments of the present disclosure.
Figure 6:
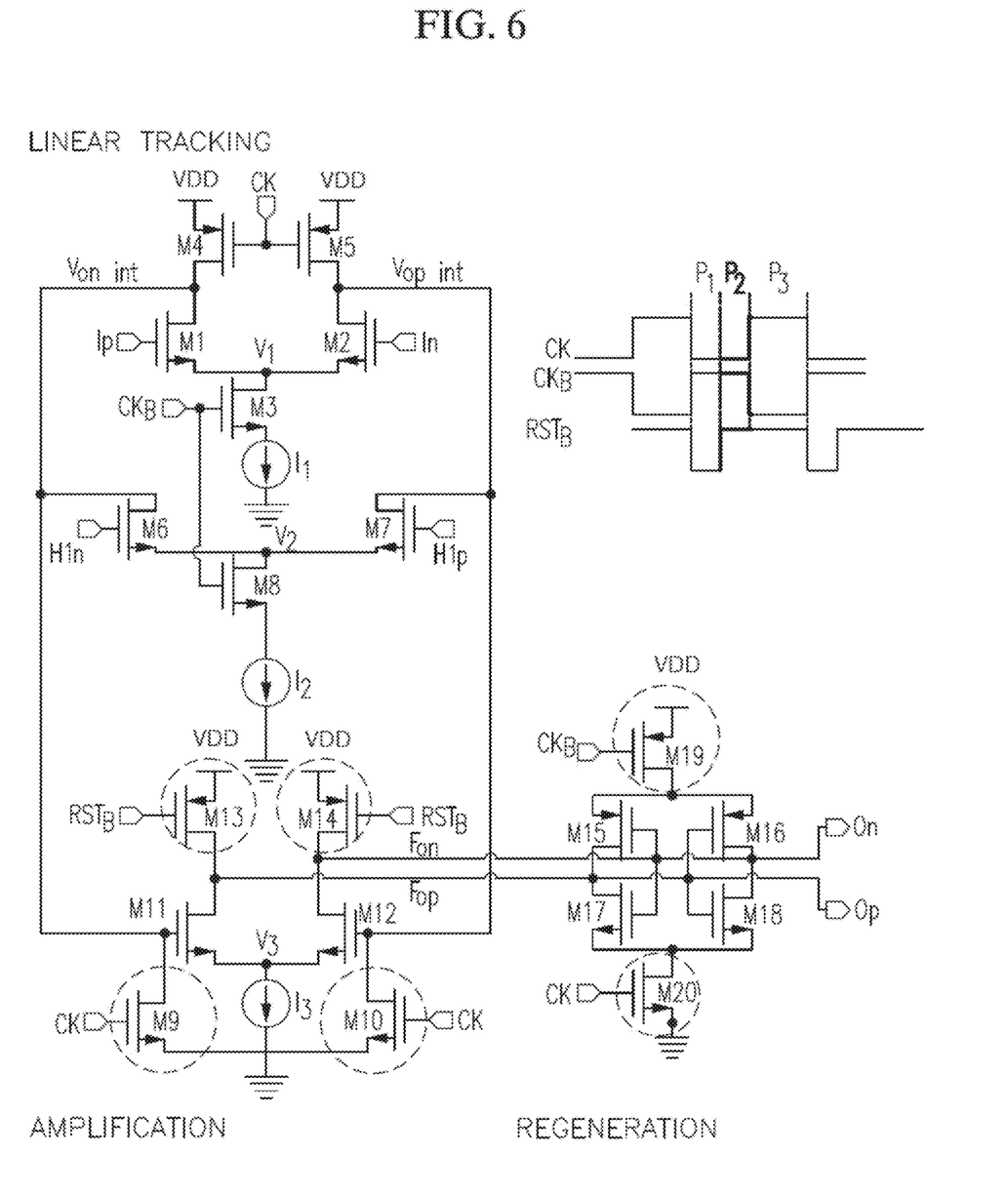
Figure 7:
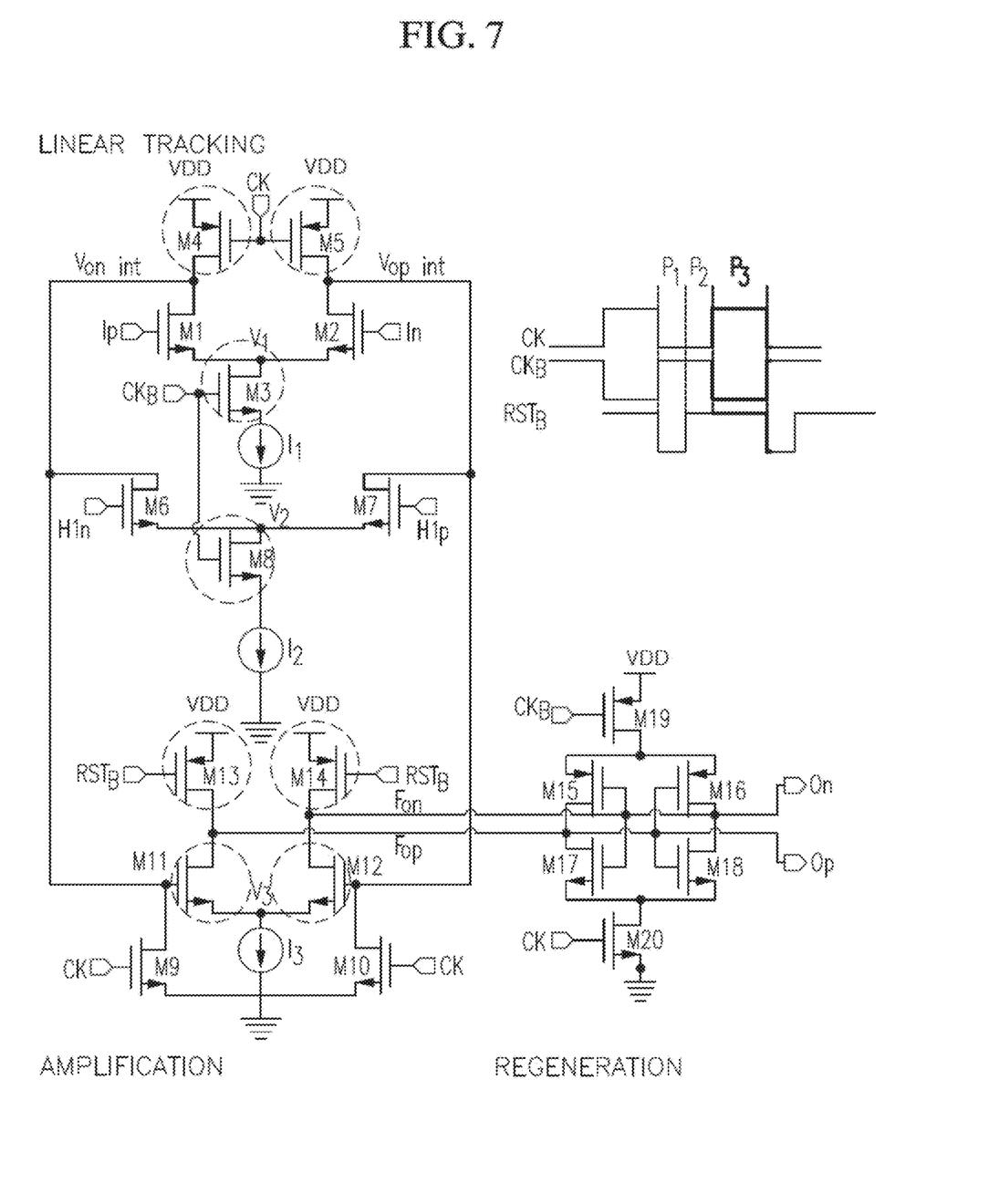

FIG. 5-7 is a schematic diagram of the slicer of FIG. 4 during various phases of operation of the slicer, according to some embodiments of the present disclosure. The operation of the slicer 306 may be generally described in three phases P1, P2, P3. FIG. 5 will be referenced to describe the first phase where the slicer 306 is restored and reset, FIG. 6 will be referenced to describe the second phase for performing correction and amplification, and FIG. 7 will be referenced to describe the third phase for performing regeneration.

With reference to FIG. 5, during the first phase shown as P1 in the timing diagram, the slicer 306 is first restored to workable conditions. In other words, the existing condition or voltages throughout the circuit may be unknown and may be in an undesired state, and therefore all previous conditions are reset by restoring the voltages to desired states. More specifically, the desired states may include turning on transistors M1-M8 and M11-M18 and turning off transistors M9, M10, M19, and M20 as the first clock signal CK goes low. In FIGS. 5-7, the transistors that are turned-off are shown with a circle around the transistor using dashed lines, for illustrative purposes only. Accordingly, because transistors M3, M8, and M11-14 are now turned on, the voltages at tail nodes V1, V2, and V3 are restored to their nominal voltages. In some embodiments, the nominal voltages may be about 300 mV, although not necessarily limited thereto. In other embodiments, the nominal voltages may be, for example, 500 mV, 1V, 3V or 5V. Accordingly, these nominal voltages at nodes V1, V2, and V3 provide the current sources I1, I2, and I3 headroom and allow the current sources I1, I2, and I3 to turn on and conduct current. Additionally, the slicer output voltages On and Op are pulled up to the source voltages (e.g., VDD) to reset the output voltages corresponding to previous decisions. Accordingly, all components and outputs of the slicer 306 circuit are reset and restored to their nominal working voltages to complete the first phase.

Moving on to the second phase shown in P2 in the timing diagram with reference to FIG. 6, the objective of this phase is to make corrections (or adjustments) to the current cycle voltages based on the previous cycles, and amplify the corrected voltage. According to some embodiments, once the first phase is completed, the linear tracking portion of the slicer 306 is configured to behave like a common source amplifier. Accordingly, input voltages Ip and In are provided to the gates of input transistors M1 and M2, and internal output voltages Von int and Vop int, respectively, are generated at the drains of the input transistors M1 and M2. More particularly, the input voltages Ip and In may be applied as differential voltages and therefore, the input transistors M1 and M2 may generate internal output voltage difference (Vop int−Von int) that is proportional to the input voltage differences (Ip−In). Here, transistors M4 and M5 act as resistive loads.

In some embodiments, previous bits are applied to the gates of feedback transistors M6 and M7 to correct by subtracting or reducing the internal output voltages Von int or Vop int. Previous bits are either a 1 or 0, and therefore may correspond to either VDD or 0V. Accordingly, if the previous bit is 1, then H1$n$=1 and H1$n$=0. Therefore, when a 1 is applied to the gate of feedback transistor M7, M7 is turned on, thereby allowing current from current source I2 to flow through the branch on the right side of the circuit and lowering the internal output voltage Vop int. In essence, the internal output voltage Vop int is reduced or a subtraction is performed, thereby compensating the internal output voltage Vop int based on feedback from the previous bit.

Similarly, if the previous bit is 0, then H1$n$=1 and H1$p$=0 and the same process occurs on at the branch on the left side of the circuit. Therefore, when a 1 is applied to the gate of feedback transistor M6, M6 is turned on, thereby allowing current from current source I2 to flow through the left branch and lowering the internal output voltage Von int. Therefore, the internal output voltage Von int is reduced or a subtraction is performed, thereby compensating the internal output voltage Von int based on feedback from the previous bit.

According to various embodiments, the internal output voltage Von int and Vop int, now compensated by the above subtraction, are applied to the gate of transistors M11 and M12. Here, the compensated internal output voltages may be considered a clean signal with no previous bit affection. Therefore, the compensated internal output voltages are amplified by transistors M11 and M12 in the amplification stage, which act as amplifiers to generate floating output voltages FOn and FOp, respectively. Because only one of the internal output voltages Von int or Vop int was reduced, as explained above, one of the floating output voltages FOn or FOp will have a higher voltage.

Moving on to the third phase shown in the timing diagram as P3 with reference to FIG. 7, the objective of this phase is to further amplify and bring the output voltages to the desired rail-to-rail voltages (e.g., VDD and ground). In other words, even though the compensated internal output voltages were amplified to the floating output voltages FOn and FOp in the second phase, those voltages are still relatively small and do not necessarily correspond to voltages that are desired in a digital signal to correctly correspond to a logic 1 or 0. Therefore, the third phase will pull up or pull down the floating output voltages FOn and FOp to the rail voltages. Accordingly, first clock signal CK goes high and turns on transistors M9 and M10, thereby turning off transistors M11 and M12 by lowering the gate voltages of transistors M11 and M12. Transistors M13 and M14 will be turned off during this phase with a reset signal RSTB. It should be noted that transistors M4, M5, and M8, which are analog in nature, are also turned off at this stage to conserve power. Furthermore, by turning off transistors M11 and M12, the floating output voltages FOn and FOp generated during the second phase will remain floating. As transistors M19 and M20 are turned on, transistors M15-M18 are also turned on and transistors M15-M18 will cause the regeneration stage to behave as a cross-coupled inverter. Accordingly, the cross-coupled inverter regenerates the floating output voltages FOn and FOp, and pulls up the higher voltage of the floating output voltages FOn or FOp to the higher rail voltage (e.g., VDD) and pulls down the lower voltage of the floating output voltages FOn or FOp to the lower rail voltage (e.g., ground) to correspond to a digital signal represented by output voltages On and Op.

Accordingly, power consumption may be reduced by about 30% because the analog transistors are turned off in the third phase and allowing the output voltages to float. Even though the analog transistors are turned off, they may be quickly turned back on when needed again for the next cycle by performing the first phase again to reset and restore the circuit to the nominal working conditions. Moreover, the described technique is able to use a clock cycle more efficiently because the full clock cycle may be used. All of this may be achieved while also relaxing the time delay constraints by including the linear tracking stage within the slicer circuit, thereby removing the adder delay from the constraint.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "includes," "including," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A data slicer, comprising:
    input transistors configured to generate internal output voltages based on input voltages at input nodes;
    output nodes configured to generate output voltages based on the internal output voltages; and
    feedback transistors configured to adjust the internal output voltages based on correction voltages corresponding to a previous cycle of outputs of the output nodes.

2. The data slicer of claim 1, wherein one of the internal output voltages is adjusted by turning on one of the feedback transistors by one of the correction voltages.

3. The data slicer of claim 2, wherein the correction voltages are digital logic signals.

4. The data slicer of claim 2, wherein
    the turning on the one of the feedback transistors comprises reducing the one of the internal output voltages to generate an adjusted internal output voltage, and
    in response to turning on the one of the feedback transistors, one of the output nodes is configured to output an output voltage based on the adjusted internal output voltage.

5. The data slicer of claim 4, wherein the adjusted internal output voltage is a clean signal that is free of affection by previous bits.

6. The data slicer of claim 4, further comprising an amplifier circuit configured to amplify the adjusted internal output voltage to generate a floating output voltage, and in response to amplifying the adjusted internal output voltage, the one of the output nodes is configured to output the output voltage based on the floating output voltage.

7. The data slicer of claim 6, further comprising a regeneration circuit coupled between the amplifier circuit and the output nodes.

8. The data slicer of claim 7, wherein the regeneration circuit comprises a cross-coupled inverter configured to pull the floating output voltage to generate the output voltage.

9. A method for operating a data slicer comprising input transistors configured to generate internal output voltages based on input voltages at input nodes, output nodes configured to generate output voltages based on the internal output voltages, and feedback transistors configured to adjust the internal output voltages based on correction voltages corresponding to a previous cycle of outputs of the output nodes, the method comprising:
    pulling the output voltages to a source voltage in a first phase;
    applying the input voltages to the input transistors and the correction voltages to the feedback transistors in a second phase to generate the internal output voltages in the second phase, wherein an amplifier circuit outputs a floating output voltage to a regeneration circuit in response to the adjusted internal output voltages; and
    deactivating the amplifier circuit and activating the regeneration circuit in a third phase, wherein the regeneration circuit regenerates the output voltages at the output nodes.

10. The method of claim 9, further comprising resetting the input transistors and the feedback transistors by turning on the input transistors and the feedback transistors in the first phase.

11. The method of claim 9, wherein the internal output voltages are generated by operating the input transistors as a common source amplifier in the second phase.

12. The method of claim 9, further comprising adjusting one of the internal output voltages by one of the feedback transistors based on one of the correction voltages.

13. A data slicer, comprising:
a linear tracking circuit comprising:
a pair of input transistors each configured to generate a respective internal output voltage based on a corresponding input voltage at a respective input node; and
a pair of feedback transistors each configured to adjust the respective internal output voltage of the pair of input transistors based on a correction voltage corresponding to a previous cycle of a corresponding output voltage at an output node.

14. The data slicer of claim 13, wherein the respective internal output voltage is adjusted by turning on one of the pair of feedback transistors by the correction voltage.

15. The data slicer of claim 14, wherein the correction voltage is a digital logic signal.

16. The data slicer of claim 14, wherein
the turning on the one of the pair of feedback transistors comprises reducing a corresponding internal output voltage to generate an adjusted internal output voltage, and
in response to turning on the one of the pair of feedback transistors, the output node is configured to output an output voltage based on the adjusted internal output voltage.

17. The data slicer of claim 16, wherein the adjusted internal output voltage is a clean signal that is free of affection by previous bits.

18. The data slicer of claim 16, further comprising an amplifying circuit configured to amplify the adjusted internal output voltage from the linear tracking circuit to generate a floating output voltage, and in response to amplifying the adjusted internal output voltage, the output node is configured to output the output voltage based on the floating output voltage.

19. The data slicer of claim 18, further comprising a regeneration circuit coupled to the amplifying circuit.

20. The data slicer of claim 19, wherein the regeneration circuit comprises a cross-coupled inverter configured to pull the floating output voltage to generate the output voltage.

* * * * *